United States Patent [19]
Phillips

[11] 3,751,882

[45] Aug. 14, 1973

[54] GAS SCRUBBER WITH MOISTURE ELIMINATOR

[75] Inventor: Norman D. Phillips, Bethlehem, Pa.

[73] Assignee: Fuller Company, Catasauqua, Pa.

[22] Filed: June 4, 1971

[21] Appl. No.: 150,072

[52] U.S. Cl.............. 55/236, 55/238, 55/239, 55/257, 261/79 A, 261/117
[51] Int. Cl.............................................. B01f 3/04
[58] Field of Search.................. 55/235, 236, 237, 55/238, 239, 257; 261/79 A, 117

[56] References Cited
UNITED STATES PATENTS

| | | | |
|---|---|---|---|
| 1,980,522 | 11/1934 | Hawley | 261/117 |
| 3,673,769 | 7/1972 | Gleason | 55/237 |
| 3,581,474 | 6/1971 | Kent | 55/238 |
| 2,409,088 | 10/1946 | Weits et al. | 55/238 |
| 3,626,672 | 12/1971 | Burbidge | 55/238 |
| 844,312 | 2/1907 | Bachman | 55/237 |
| 2,438,868 | 3/1948 | Trier | 261/78 A |

Primary Examiner—Tim R. Miles
Assistant Examiner—Steven H. Markowitz
Attorney—Jack L. Prather and Frank H. Thomson

[57] ABSTRACT

A gas scrubber which is improved by the addition of a moisture eliminator arrangement between the scrubbing zone and the clean gas outlet. The moisture eliminator is particularly designed for use in a countercurrent flow, high energy scrubber in which scrubbing liquid is atomized by means of compressed air and injected into the dirty gas countercurrent to the flow of dirty gas. The moisture eliminator includes a toroidal shaped cylinder having a plurality of spin vanes. The spin vanes and scrubber are dimensioned to maintain gas flow velocities within specified limits.

4 Claims, 4 Drawing Figures

Patented Aug. 14, 1973
3,751,882
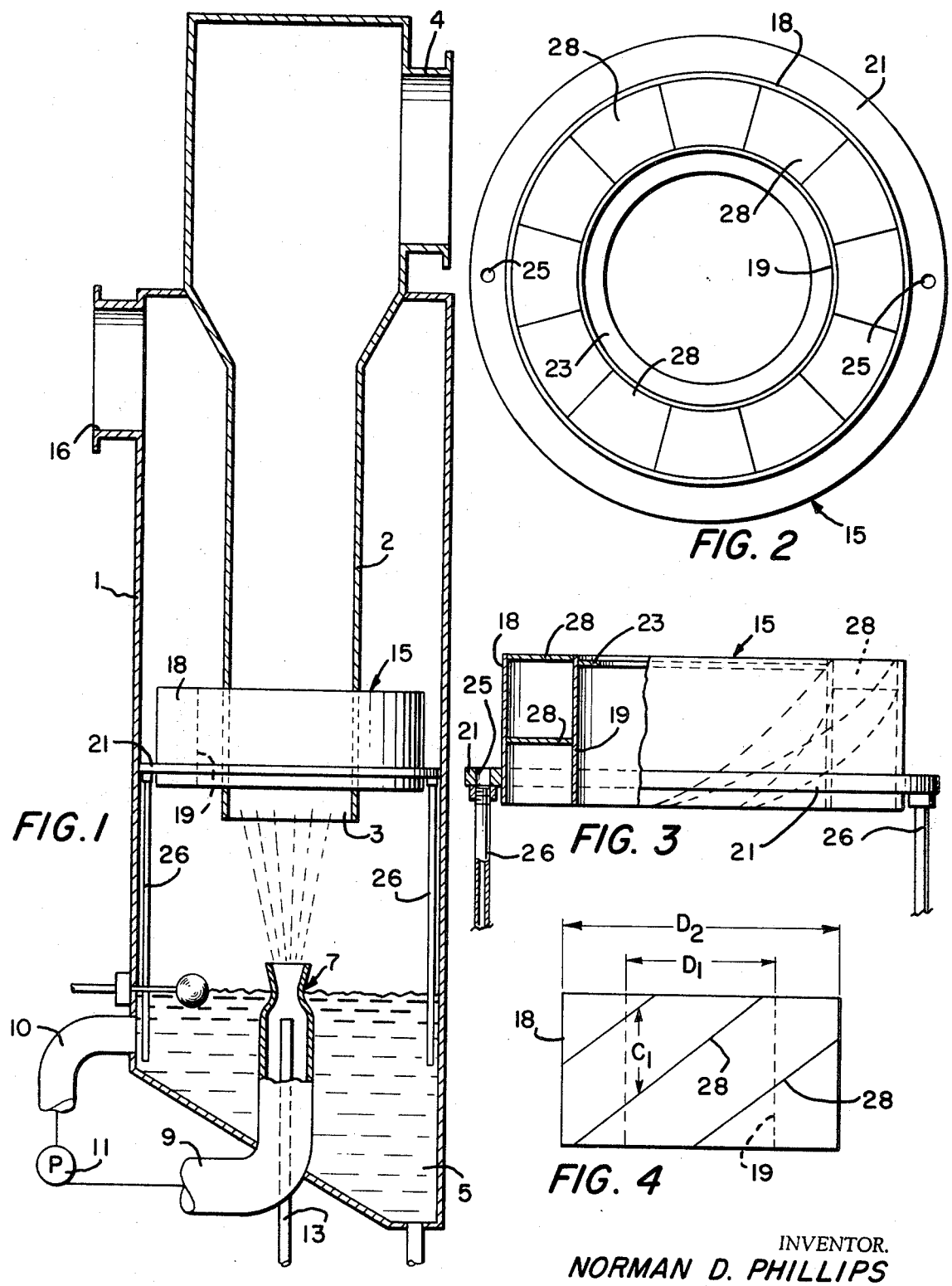

GAS SCRUBBER WITH MOISTURE ELIMINATOR

BACKGROUND OF THE INVENTION

This invention relates to gas or wet scrubbers and in particular to an improved gas scrubber employing a moisture eliminator between the scrubbing zone and the clean gas outlet.

As is well known in the art, gas scrubbers are a common means of removing gaseous and particulate pollutants from gases. A gas scrubber operates on the general principle that a scrubbing liquid such as water sprayed into a stream of dirty gas will serve to wash the pollutants from the gas and such pollutants will be carried away in the scrubbing liquid. However, during such scrubbing action, water droplets are entrained in the clean gas, and if allowed to remain therein they could be a source of contamination to the outside atmosphere because some of the pollutants being removed from the gas stream are carried in the droplets. If large quantities of droplets are present, they could produce a dirty rain when the terminal velocity of the droplets is reached in the atmosphere. These droplets must be removed so that only evaporated moisture is present in the gas stream.

Heretofore it has been known to add a moisture or mist eliminator to the scrubber and such moisture eliminator has taken many shapes. Many scrubbers employ what is essentially a large tank through which the gases emitted from the scrubber pass, and the moisture which would normally fall out in the atmosphere is removed in this large tank. However, such large tanks can be expensive to manufacture and install and require a great deal of often unavailable land area. Other types of moisture eliminators are known and spin vanes for removing moisture from a gas are known per se. However, to my knowledge, spin vanes such as that employed by the present invention and in the flow position that the present mist eliminator is located have not been heretofore used.

The present invention is particularly designed for use with the gas scrubber shown in the copending patent application of Roland L. Lincoln, Ser. No. 30,670, filed Apr. 22, 1970, and assigned to the Assignee of the present invention.

A moisture eliminator similar to the present invention is shown in U.S. Pat. No. 1,138,460 issued to W. M. Derby. However, it is believed that the present invention is more economical and a better construction than that shown in his patent. It is believed that the moisture eliminator shown in that patent will severely reduce the capacity of the scrubber if the amount of moisture in the gas is significantly reduced.

SUMMARY

It is the principal object of this invention to provide a gas scrubber and moisture eliminator combination which substantially eliminates the water droplet content of gas discharged from the scrubber without interfering with the capacity of the scrubber.

It is another object of this invention to provide a novel moisture eliminator for use with a gas scrubber of the countercurrent flow type.

The foregoing and other objects will be carried out by providing a gas scrubber comprising a vessel, a tube mounted in said vessel and having an open end communicating with the inside of the vessel, dirty gas inlet means communicating with said tube, clean gas outlet means communicating with said vessel and separated from direct communication with said dirty gas inlet means, said vessel defining a settling basin below the open end of said tube, an atomizing nozzle, means for supplying scrubbing liquid to the atomizing nozzle, said nozzle being positioned for discharging scrubbing liquid into the tube whereby dirty gas enters said tube and passes downwardly therethrough and is contacted by scrubbing liquid discharged from said atomizing nozzle and is thereby cleaned and passes out of said vessel through said clean gas outlet means, the improvement comprising moisture eliminator means mounted in said vessel outside of said tube and in the gas flow path between the open end of said tube and the clean gas outlet means, said moisture eliminator means including an open ended toroidal cylinder having solid walls and at least one vane mounted within the walls thereof for imparting a spiral motion to the clean gas, the top of said toroidal cylinder being spaced from the clean gas outlet means.

BRIEF DESCRIPTION OF THE DRAWING

The invention will be described in connection with the annexed drawing wherein:

FIG. 1 is a sectional view of the scrubber and moisture eliminator of the present invention;

FIG. 2 is a top plan view on an enlarged scale of the moisture eliminator of the present invention;

FIG. 3 is an elevational view, partly in section, of the moisture eliminator of the present invention; and FIG. 4 is a diagrammatic view of the moisture eliminator of the present invention.

DESCRIPTION OF THE PREFERRED EMBODIMENT

The moisture eliminator of the present invention will be described in connection with a gas scrubber of the type disclosed and claimed in U.S. Pat. Application Ser. No. 30,670 of Roland L. Lincoln.

Referring to FIG. 1, the scrubber includes a vessel 1 having a gas collecting tube 2 having an open end 3 communicating with the vessel 1. A dirty gas inlet means 4 is connected to the gas collecting tube 2. The vessel 1 defines a settling basin 5 for scrubbing liquid below the open end 3 of the tube 2.

As described in the above mentioned patent application, the scrubber includes an atomizing nozzle generally indicated at 7 which is positioned below the open end of the tube 2 for directing scrubbing liquid into the open end of that tube. The atomizing nozzle 7 includes a pipe 9 for supplying scrubbing liquid to the nozzle 7. In the preferred form, a recirculation system is employed and liquid is conducted from settling basin 5 through pipe 10 and a pump 11 to the pipe 9. Gaseous fluid such as air under pressure is supplied from a source such as a compressor (not shown) through a pipe 13 to the nozzle 7. The compressed air serves to atomize the scrubbing liquid and force it upwardly into the open end of the tube 2 at a high velocity. Dirty gas entering the tube 2 flows down through that tube and is contacted by the high velocity atomized liquid.

After contact with the scrubbing liquid inside the tube 2, the cleaned gas flows out through the open end 3 of the tube 2 and will impinge against the surface of the settling basin 5. From there, the cleaned gas will pass through the moisture eliminator generally indicated at 15 and out through an outlet means 16 which communicates with the vessel 1.

The moisture eliminator 15 includes a toroidal shaped cylinder having closed side walls 18 and 19. The toroidal cylinder is secured to the vessel 1 by an annular member 21 and to the tube 2 by an annular member 23. Holes 25 in the annular member 21 are connected to pipes 26 and serve to drain liquid which reaches the upper portion of the vessel back into the settling basin 5. A plurality of spin vanes 28 are mounted in the area between the closed walls 18 and 19 and spiral around the toroidal cylinder. Preferably, these spin vanes extend for a circumferential arc of at least 90°. In the drawing, there are shown twelve such vanes but this number may be increased or decreased depending upon the particular application and size of the scrubber. An important feature is that the vanes overlap by an amount sufficient to prevent a vertical flow path through the moisture eliminator.

As the cleaned gas containing moisture moves upwardly through the moisture eliminator 15, the vanes 28 serve to give a spiral motion to the upwardly flowing gas. When the gas is discharged from the moisture eliminator 15 in this spiral path, the liquid droplets in the gas are forced by centrifugal force to the edge of the vessel 1 and drip down the side of the vessel 1, through the openings 25, pipes 26 and to the settling basin 5. The clean substantially moisture free gas is exhausted through outlet means 16.

It has been found that for proper operation of the scrubber and moisture eliminator, the largest diameter of the vessel 1 and the diameter of the tube 2 should be dimensioned so that the velocity of gas flow between the moisture eliminator 15 and the outlet 16 does not exceed 1000 feet per minute. It has been found that if the upward velocity exceeds 1000 feet per minute, there will be moisture carryover and the moisture eliminator will not serve to remove sufficient moisture from the exhausted gas.

It has also been found that the distance between the vanes, defined by dimension $C_1$ in FIG. 4 and the difference in area between dimensions $D_1$ and $D_2$ of FIG. 4 should be such that the velocity of gas flowing through the moisture eliminator 15 is between about 3000 and 5000 feet per minute. If the velocity through the moisture eliminator 15 exceeds 5000 feet per minute, it is believed that the pressure drop across the moisture eliminator will be excessively high and the capacity of the scrubber will be substantially reduced. Thus, the increased velocity through the moisture eliminator reduces the amount of dirty gas which can flow through tube 2 and be cleaned by the scrubber.

In order to achieve these velocities, one scrubber employed a dimension $D_1$ of 25 inches and a dimension $D_2$ of 36 inches with a distance $C_1$ between vanes of 2 ½ inches. The largest diameter of the vessel 1 was 42 inches and the diameter of the tube 2 was 19 ½ inches. Using these dimensions, it was possible to maintain the required velocities regardless of the velocity of incoming dirty gas.

The top of the moisture eliminator 15 is spaced from the outlet 16 by a distance sufficient to allow the cleaned gas which passes through the moisture eliminator to move in a spiral path for a period of time sufficient to allow the liquid droplets to reach the side walls of the vessel 1. It is believed that the distance between the top of the moisture eliminator and the outlet 16 should be at least about equal to the diameter of the largest diameter of the vessel 1 above the moisture eliminator.

From the foregoing, it should be apparent that the objects of this invention have been carried out. A scrubber and moisture eliminator combination has been provided which substantially reduces the amount of water vapor emitted from the scrubber.

It is intended that the foregoing description be merely that of a preferred embodiment and that the invention be limited solely by that which is within the scope of the appended claims.

I claim:

1. A gas scrubber comprising a vessel, a tube mounted in said vessel and having an open end communicating with the inside of the vessel, dirty gas inlet means communicating with said tube, clean gas outlet means communicating with said vessel and separated from direct communication with said dirty gas inlet means, said vessel defining a settling basin below the open end of said tube, an atomizing nozzle, means for supplying scrubbing liquid to the atomizing nozzle, said nozzle being positioned for discharging scrubbing liquid into the tube whereby dirty gas enters said tube and passes downwardly therethrough and is contacted by scrubbing liquid discharged from said atomizing nozzle and is thereby cleaned and passes out of said vessel through said clean gas outlet means, the improvement comprising moisture eliminator means mounted in said vessel outside of said tube and in the gas flow path between the open end of said tube and the clean gas outlet means, said moisture eliminator means including an open ended toroidal cylinder having solid walls and at least one vane mounted within the walls thereof for imparting a spiral motion to the clean gas, the top of said toroidal cylinder being spaced from the clean gas outlet means, said vessel between said moisture eliminator means and said clean gas outlet means being dimensioned so that the velocity of clean gas between the moisture eliminator means and said clean gas outlet means does not exceed approximately 1000 feet per minute.

2. The gas scrubber of claim 1 wherein there are a plurality of separate vanes mounted within the walls of said toroidal cylinder which at least partially spiral around said cylinder and extend from substantially the top of the cylinder to substantially the bottom of said cylinder, each of said vanes extending for a circumferential arc of about 90°.

3. The gas scrubber of claim 1 wherein there are a plurality of separate vanes mounted within the walls of said toroidal cylinder which at least partially spiral around said cylinder and extend from substantially the top of the cylinder to substantially the bottom of the cylinder and said toroidal cylinder is dimensioned and said vanes are spaced a distance so that the velocity of gas passing through said mist eliminator means is between about 3000 and 5000 feet per minute.

4. The gas scrubber of claim 1 wherein the top of said toroidal cylinder is spaced from said clean gas outlet means by a distance at least equal to the largest diameter of said vessel.

* * * * *